(12) United States Patent
Leszczyna

(10) Patent No.: US 11,057,354 B2
(45) Date of Patent: Jul. 6, 2021

(54) METHOD AND SYSTEM FOR ANONYMOUS SENDING OF MESSAGES WITH POSSIBILITY OF RESPONDING

(71) Applicant: Rafal Marek Leszczyna, Gdansk (PL)

(72) Inventor: Rafal Marek Leszczyna, Gdansk (PL)

(*) Notice: Subject to any disclaimer, the term of this patent is extended or adjusted under 35 U.S.C. 154(b) by 0 days.

(21) Appl. No.: 17/102,459

(22) Filed: Nov. 24, 2020

(65) Prior Publication Data

US 2021/0075771 A1 Mar. 11, 2021

(51) Int. Cl.
*H04L 29/06* (2006.01)
*G06F 21/62* (2013.01)
*H04L 12/58* (2006.01)

(52) U.S. Cl.
CPC ...... *H04L 63/0421* (2013.01); *G06F 21/6254* (2013.01); *H04L 51/28* (2013.01)

(58) Field of Classification Search
CPC ..... H04L 63/0421; H04L 51/28; H04L 63/08; G06F 21/6254
See application file for complete search history.

(56) References Cited

U.S. PATENT DOCUMENTS

| | | | |
|---|---|---|---|
| 6,851,049 B1 | 2/2005 | Price, III | |
| 7,707,624 B2* | 4/2010 | Tomkow | H04L 51/28 |
| | | | 726/5 |
| 9,032,037 B2 | 5/2015 | Huang et al. | |
| 9,087,215 B2* | 7/2015 | LaFever | H04L 63/0407 |
| 9,262,623 B2* | 2/2016 | Stecher | G06F 21/45 |
| 9,268,933 B2* | 2/2016 | Stecher | H04L 63/0421 |
| 9,514,459 B1* | 12/2016 | Doshi | H04L 63/0281 |
| 9,553,863 B2 | 1/2017 | Greenberg-Barak et al. | |
| 9,886,594 B1* | 2/2018 | Chaganti | G06F 21/6272 |
| 10,084,595 B2* | 9/2018 | Mohajeri | H04L 9/0872 |
| 10,965,668 B2* | 3/2021 | Caldera | H04L 67/22 |

* cited by examiner

*Primary Examiner* — Hosuk Song

(57) ABSTRACT

The present invention relates to a method and a system that enable a sender to send a message to a recipient in an anonymous way, allowing the recipient to respond to the sender after receiving the message. No data related to the sender and the recipient are retained in the system.

17 Claims, 2 Drawing Sheets

METHOD AND SYSTEM FOR ANONYMOUS SENDING OF MESSAGES WITH POSSIBILITY OF RESPONDING

FIELD OF THE INVENTION

The present invention relates to the field of electronic communications and particularly to a method and a system that enable a sender to anonymously send a message to a recipient, allowing the recipient to respond to the sender after receiving the message.

BACKGROUND OF THE INVENTION

There are multiple contexts in which a party wishes to send a message or another type of electronic communication to a particular recipient anonymously while retaining the opportunity of being responded. For instance, a person may wish to anonymously send an inquiry or a signaling message related to a sensitive situation, having the possibility of their communication being replied to by the recipient. As another example, a person may wish to anonymously request for a medical treatment conceal on a sensitive health issue. Also, in information sharing systems, anonymity is desired when submitting an inquiry on sensitive issues.

Existing approaches to provide anonymity in such situations require registration, pseudonym accounts, provision of selected personal data, or some other data that could eventually lead to the identification of the sender. Often, they take advantage of conventional payment solutions, such as credit card payments. As such, the approaches are characterized by a reduced level of anonymity of the sender because at any time the link between the sender and the message or delivery can be retrieved.

SUMMARY OF THE INVENTION

The present invention relates to a method and a system that address the above disadvantages and other disadvantages not described above. In the invention, no data related to the sender and the recipient are retained in the system.

The subject matter claimed herein is not limited to embodiments that solve the above disadvantages or that operate only in environments such as those described above. Rather, this background is only provided to illustrate selected application areas where some embodiments described herein may be practiced.

BRIEF DESCRIPTION OF DRAWINGS

Embodiments of the disclosure may be better understood by referencing the accompanying drawings.

It should be understood that the present drawings are not necessarily to scale and that the embodiments disclosed herein are sometimes illustrated by fragmentary views. In certain instances, details which are not necessary for an understanding of the present invention or which render other details difficult to perceive may have been omitted. Instead, the emphasis is being placed upon illustrating the principles of the invention. It should also be understood that the invention is not necessarily limited to the particular embodiments illustrated herein. Like numbers utilized throughout the various figures designate like or similar parts or structure.

DETAILED DESCRIPTION OF THE INVENTION

In the following description, specific details of the present invention are provided. Various modifications to the disclosed embodiments will be readily apparent to those skilled in the art, and the general principles defined herein may be applied to other embodiments and applications without departing from the spirit and scope of the present invention. At the same time, well-known features have not been described in detail so as not to obscure the invention. Thus, the present invention is not intended to be limited to the embodiments presented but is to be accorded the widest scope consistent with the principles and features disclosed herein.

The invention relates to a method and a system that enable a sender to send a message to a recipient in an anonymous way, allowing the recipient to respond to the sender on the receipt of the message. The message may be in the form of an electronic message such as a text message, an e-mail, or a voicemail message, etc.

Figure 1:
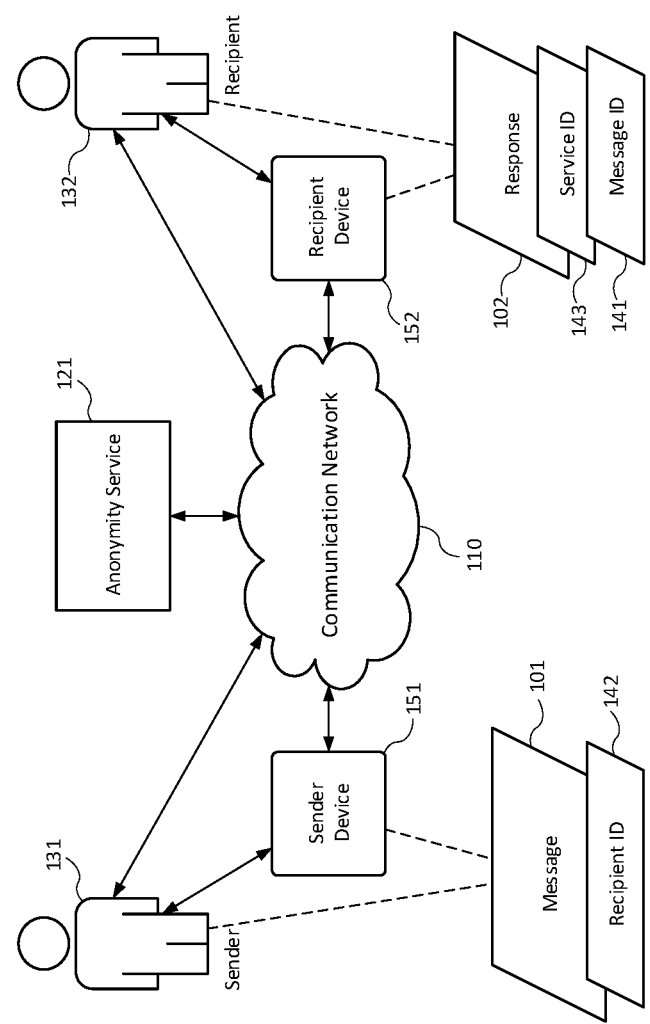
FIG. 1 is a block diagram depicting the components of the system of the invention according to one embodiment.

FIG. 1 illustrates an embodiment of the system of the invention. Both, the message 101 and the response 102 are sent via a communication network 110. The communication network may have an electronic form. In such an embodiment, the network can include any type of wired or wireless communication channel capable of linking computing nodes. This includes, but is not limited to, a local area network, a wide area network, or a combination of networks. In particular, the Internet may be utilized as a communication network.

The anonymity service 121 receives messages from senders 131, processes them, and sends to recipients 132. As one embodiment, the service may be provided by a computer program executed on a computing node. The program may comprise one or more modules or blocks of machine-readable code. Each module may be configured to implement particular functionality when executed by one or more processors, and the various modules may work together to provide integrated overall functionality. In certain embodiments, the program may be implemented as hardware, i.e. a processor, a chip, or another type of electronic circuit, or in a hybrid form, that is employing software components and hardware components. The program may take the form of a website or a server application. As an embodiment of the invention, the use of the system may be enabled for a fee.

Processing of messages includes, but is not limited to, generating the ID of a message 141. For a defined time, the message ID needs to be unique or relatively unique, enabling differentiation of the message from other messages processed in the defined time. As an exemplary embodiment, a message digest computed on the content of the message combined with a timestamp can be utilized. The anonymity service couples the message IDs with messages before sending them to recipients. Also, the anonymity service receives responses from recipients and stores them for a defined time or until they are presented or delivered to the (initial) sender 131. The anonymity service enables the (initial) senders 131 to check if a response 102 to their (initial) message 101 has arrived. Upon successful verification, it delivers the response 102 to the (initial) sender 131.

In addition to the above-described features, the anonymity service may include other auxiliary features. For instance, it may support the creation and composition of messages or provide auxiliary message sending and delivery features. It may also eliminate or separate personal data from among the data included in the message. In another embodiment, the anonymity service may encrypt the content of the message using, for instance, symmetric ciphers such as AES or asymmetric ciphers such as RSA. The anonymity service may also compress the content of the message using, for instance, ZIP, RAR, or 0.7z algorithms and formats. All or a selection of the above-described features may be provided, at the request of a sender or a recipient. In another embodiment, the anonymity service may examine the message with regard to its content comprising a word and/or phrase from a list of predetermined words and/or phrases, and/or malicious instructions that can be potentially executed on the recipient device. It may also employ means of verification if the sender is human, such as, for instance, the Captcha mechanism. In another embodiment, additional content may be incorporated into the message, such as a privacy statement, an informative message, or a trademark associated with the system. In a particular embodiment, the service may introduce payment options. Preferably, but not limited to, these payment options should be anonymous. The service and the system may be provided to one or multiple senders and recipients, twenty-four hours a day, seven days a week, each day per year, or otherwise as desired. Also, the system may include multiple anonymity services. The system may operate world-wide without frontiers.

The sender may communicate with the anonymity service directly or using a sender device 151. The sender device may be an electronic device, such as a computing device. In one embodiment, the communication may be supported by a computer program executed on the sender device that provides additional auxiliary features. The computer program may, for example, cause the processor of the sender device to cause a display thereof to display a graphical user interface. The computer program may be also in the form of an "app" (or "application") or software application which the sender downloads and installs on their device (such as by storing in it the memory). Furthermore, the computer program may be provided as an extension to a separate computer program. For instance, it may have the form of an extension to an e-mail or messaging application. In a preferred embodiment, the sender may interact with the anonymity service via a network of anonymization nodes, such as ToR or Freenet, or another type of anonymity system that increases untraceability.

For a message to be correctly delivered to the recipient, the ID of the recipient 142 needs to be coupled with the message. As an example, in the context of e-mail communication, the ID of the recipient may be an e-mail address of the recipient. As another example, if phone-based electronic messaging is utilized, the ID of the recipient may be the recipient's phone number. To enable responses to the message, the anonymity service needs to generate a message ID and couple it with the message.

Similarly, the recipient may communicate with the anonymity service directly or using a recipient device 152. The recipient device may be an electronic device, such as a computing device. In one embodiment, the communication may be supported by a computer program executed on the recipient device that provides additional auxiliary features. The computer program may, for example, cause the processor of the recipient device to cause a display thereof to display a graphical user interface. The computer program may be also in the form of an "app" (or "application") or software application which the recipient downloads and installs on their device (such as by storing in it the memory). Furthermore, the computer program may be provided as an extension to a separate computer program. For instance, it may have the form of an extension to an e-mail or messaging application. In a preferred embodiment, the recipient may interact with the anonymity service via a network of anonymization nodes, such as ToR or Freenet, or another type of anonymity system that increases untraceability.

For a response 102, to be correctly delivered to the (initial) sender 131, the ID of the anonymity service 143 needs to be coupled with the response 102. As an example, in the context of e-mail communication, an e-mail address of the anonymity service may be utilized. As another example, for phone-based electronic messaging, the ID of the anonymity service may be the anonymity service's phone number. Also, to assure correct delivery of the response the ID of the (original) message 141 needs to be coupled with the response.

Figure 2:
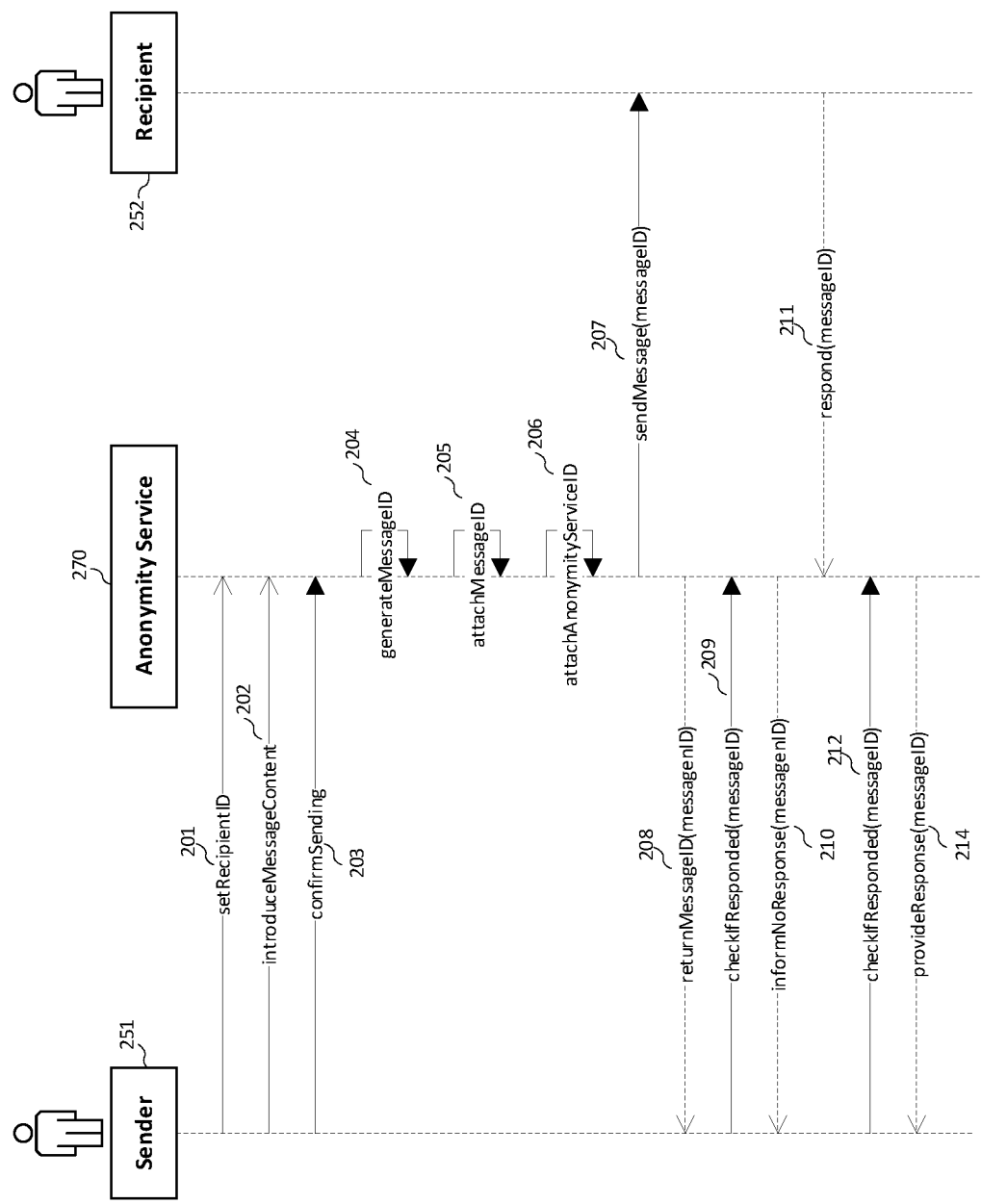
FIG. 2 illustrates an embodiment of the method of the invention.

FIG. 2 presents an embodiment of the method of the invention. In the embodiment, a sender 251 introduces, in any order, an ID of the recipient and the content of the message to be sent to the recipient 201, 202. In a preferred embodiment of the method, providing the ID of the recipient and the content of the message is sufficient for the message to be ready for sending. However, in alternative embodiments, also other data may be introduced into the message, including control data or attachments. The message may be in the form of an electronic message such as a text message, an e-mail, a voicemail message, etc.

After confirming the sending of the message to the anonymity service 270 by the sender 203, the system generates an ID of the message 204 and attaches it to the message 205. To enable responding to the message, the ID of the anonymity service is provided as the sender ID 206. Then, the service sends the message to the recipient 207 and provides the message ID to the sender 208. After the message is sent, neither the message nor the ID of the recipient nor the ID of the message is retained in the system.

On message receipt, the recipient 252 may respond to the message by sending a response 211. The response needs to contain the message ID of the original message sent by the (initial) sender 251 and the ID of the anonymity service as the recipient ID of the response. At any time, the (initial) sender 251 may provide the anonymity service with the ID of the message that they sent to check if a response has arrived 209, 212. If the response has arrived in the service, it is presented to the sender 214. Otherwise, an informative message may be presented regarding the status (e.g. the absence) of the response 210. The response may be retained in the service for a defined time or it may be removed after being presented to the sender. The removal of the message may be performed after confirmation of the sender.

Various modifications could be made to the exemplary embodiments, as described above concerning the corresponding illustrations. Thus, without departing from the scope of the invention, it is intended that all matter contained in the foregoing description and shown in the accompanying drawings shall be interpreted as illustrative rather than limiting. The breadth and scope of the present invention should not be limited by any of the above-described exemplary embodiments but should be defined only in accordance with the following claims appended hereto and their equivalents. It will be understood that the above-described arrangements of the system and the method therefrom are merely illustrative of applications of the principles of this invention and many other embodiments and modifications may be made without departing from the spirit and scope of the invention as defined in the claims.

What is claimed:

1. A method that enables a sender to send a message to a recipient in an anonymous way, allowing the recipient to respond to the sender after receiving the message, the method comprising:
   obtaining, from a sender, in any order, an ID of the recipient and a content of the message to be sent to the recipient by an anonymity service;
   obtaining by the anonymity service a confirmation of sending of the message from the sender;
   generating an ID of the message to be sent to the recipient; and
   attaching the ID of the message to the message to be sent to the recipient;
   providing an anonymity service ID as the sender ID of the message to be sent to the recipient;
   sending the message to the recipient;
   receiving by the anonymity service a response from the recipient;
   storing the response for a defined time or until at least one predefined condition is satisfied;
   obtaining by the anonymity service a request from the sender for checking if a response with a message ID has arrived to the anonymity service; and
   providing the sender with a response or an informative message regarding the status of the response.

2. The method of claim 1, wherein the ID of the message is generated as a message digest computed on the content of the message combined with a timestamp.

3. The method of claim 1 further comprising creating a message to be sent to a recipient.

4. The method of claim 1 further comprising auxiliary message sending and delivery features.

5. The method of claim 1 further comprising determining whether a message includes a word or phrase from a list of predetermined words or phrases; or malicious instructions that can be potentially executed on the recipient device.

6. The method of claim 1 further comprising paying or anonymous paying for the anonymity service.

7. The method of claim 1 further comprising eliminating or separating user personal data related from among the data included in the messages sent between the sender and the recipient.

8. The method of claim 1 further comprising encrypting the content of a message.

9. The method of claim 1 further comprising compressing the content of a message.

10. The method of claim 1 further comprising verifying whether a sender is human.

11. A system that enables a sender to send a message to a recipient in an anonymous way, allowing the recipient to respond to the sender after receiving the message, the system comprising at least one anonymity service comprising:
    obtaining, from a sender, in any order, an ID of the recipient and a content of the message to be sent to the recipient by an anonymity service;
    obtaining by the anonymity service a confirmation of sending of the message from the sender;
    generating an ID of the message to be sent to the recipient; and
    attaching the ID of the message to the message to be sent to the recipient;
    providing an anonymity service ID as the sender ID of the message to be sent to the recipient;
    sending the message to the recipient;
    receiving by the anonymity service a response from the recipient;
    storing the response for a defined time or until at least one predefined condition is satisfied obtaining by the anonymity service a request from the sender for checking if a response with a message ID has arrived to the anonymity service; and
    providing the sender with a response or an informative message regarding the status of the response.

12. The system of claim 11 further comprising one or more sender devices or one or more recipient devices for interacting with the anonymity service.

13. The system of claim 12 further comprising a computer program on a recipient device or a sender device which provides auxiliary message creation and processing features.

14. The system of claim 11, wherein the use of the system is enabled for a fee.

15. The system of claim 11, wherein the anonymity service is adapted to eliminate or separate out user personal data related from among the data included in the messages sent between the sender and the recipient.

16. The system of claim 11, wherein the anonymity service is adapted to verify if a sender is human.

17. A non-transitory computer-readable medium storing a program causing a computer to execute a method that enables a sender to send a message to a recipient in an anonymous way, allowing the recipient to respond to the sender after receiving the message, the method comprising:
    obtaining, from a sender, in any order, an ID of the recipient and a content of the message to be sent to the recipient by an anonymity service;
    obtaining by the anonymity service a confirmation of sending of the message from the sender;
    generating an ID of the message to be sent to the recipient; and
    attaching the ID of the message to the message to be sent to the recipient;
    providing an anonymity service ID as the sender ID of the message to be sent to the recipient;
    sending the message to the recipient;
    receiving by the anonymity service a response from the recipient;
    storing the response for a defined time or until at least one predefined condition is satisfied;
    obtaining by the anonymity service a request from the sender for checking if a response with a message ID has arrived to the anonymity service; and
    providing the sender with a response or an informative message regarding the status of the response.

* * * * *